(12) United States Patent
Tomatsu

(10) Patent No.: US 9,834,973 B2
(45) Date of Patent: Dec. 5, 2017

(54) OPENING AND CLOSING APPARATUS AND IMAGE FORMING APPARATUS

(71) Applicant: BROTHER KOGYO KABUSHIKI KAISHA, Nagoya-shi, Aichi-ken (JP)

(72) Inventor: Yoshiya Tomatsu, Kasugai (JP)

(73) Assignee: BROTHER KOGYO KABUSHIKI KAISHA, Nagoya-Shi, Aichi-Ken (JP)

( * ) Notice: Subject to any disclaimer, the term of this patent is extended or adjusted under 35 U.S.C. 154(b) by 71 days.

(21) Appl. No.: 15/079,763

(22) Filed: Mar. 24, 2016

(65) Prior Publication Data
US 2017/0067278 A1    Mar. 9, 2017

(30) Foreign Application Priority Data

Sep. 9, 2015   (JP) .................. 2015-178011

(51) Int. Cl.
E05F 5/02 (2006.01)
H04N 1/00 (2006.01)
G03G 21/16 (2006.01)

(52) U.S. Cl.
CPC .......... *E05F 5/02* (2013.01); *G03G 21/1628* (2013.01); *G03G 21/1633* (2013.01); *H04N 1/00551* (2013.01); *E05Y 2201/21* (2013.01); *E05Y 2201/266* (2013.01); *E05Y 2201/716* (2013.01); *E05Y 2201/722* (2013.01); *E05Y 2900/20* (2013.01); *G03G 2221/1687* (2013.01); *H04N 2201/0094* (2013.01)

(58) Field of Classification Search
CPC .......... G03G 21/1628; G03G 21/1633; G03G 2221/1687; H04N 1/00551; E05F 5/02
See application file for complete search history.

(56) References Cited

U.S. PATENT DOCUMENTS

| 7,751,751 B2* | 7/2010 | Ohta .................. G03G 21/1628 399/125 |
| 7,804,628 B2* | 9/2010 | Hashimoto ........ H04N 1/00543 358/400 |
| 8,023,859 B2* | 9/2011 | Matsumoto .............. B41J 29/02 399/125 |
| 8,699,919 B2* | 4/2014 | Takamori .................. E05F 5/02 312/327 |
| 8,874,000 B2* | 10/2014 | Kim .................... G03G 21/1628 399/125 |

(Continued)

FOREIGN PATENT DOCUMENTS

| JP | 7-102850 A | 4/1995 |
| JP | 2015-115617 A | 6/2015 |

*Primary Examiner* — Ryan Walsh

(74) *Attorney, Agent, or Firm* — Merchant & Gould P.C.

(57) ABSTRACT

There is provided an opening and closing apparatus, including: a main body; an openable body pivoting between a closed position and an open position; a connecting part connecting an end of the main body and an end of the openable body; a rack provided in one of the main body and the openable body; and an arm, wherein a part, of a pitch line of the rack, which makes contact with a pitch circle of the pinion in a state that the openable body is positioned in the vicinity of the closed position is an inclined line which is inclined to approach the other of the main body and the openable body having no rack, as the inclined line is farther away from the connecting part with the openable body being in the closed position.

11 Claims, 10 Drawing Sheets

(56) References Cited

U.S. PATENT DOCUMENTS

| | | | |
|---|---|---|---|
| 2003/0196382 A1* | 10/2003 | Yokota | E05F 15/63 49/341 |
| 2006/0029424 A1* | 2/2006 | Kawai | B41J 29/02 399/125 |
| 2006/0088336 A1* | 4/2006 | Hirose | G03G 15/60 399/110 |
| 2007/0292159 A1* | 12/2007 | Iijima | G03G 21/1628 399/110 |
| 2010/0109497 A1* | 5/2010 | Blersch | E05D 3/18 312/405 |
| 2010/0315658 A1* | 12/2010 | Niikawa | G03G 21/1628 358/1.5 |
| 2011/0134455 A1* | 6/2011 | Nagashima | H04N 1/00543 358/1.13 |
| 2015/0160601 A1 | 6/2015 | Namba | |

* cited by examiner

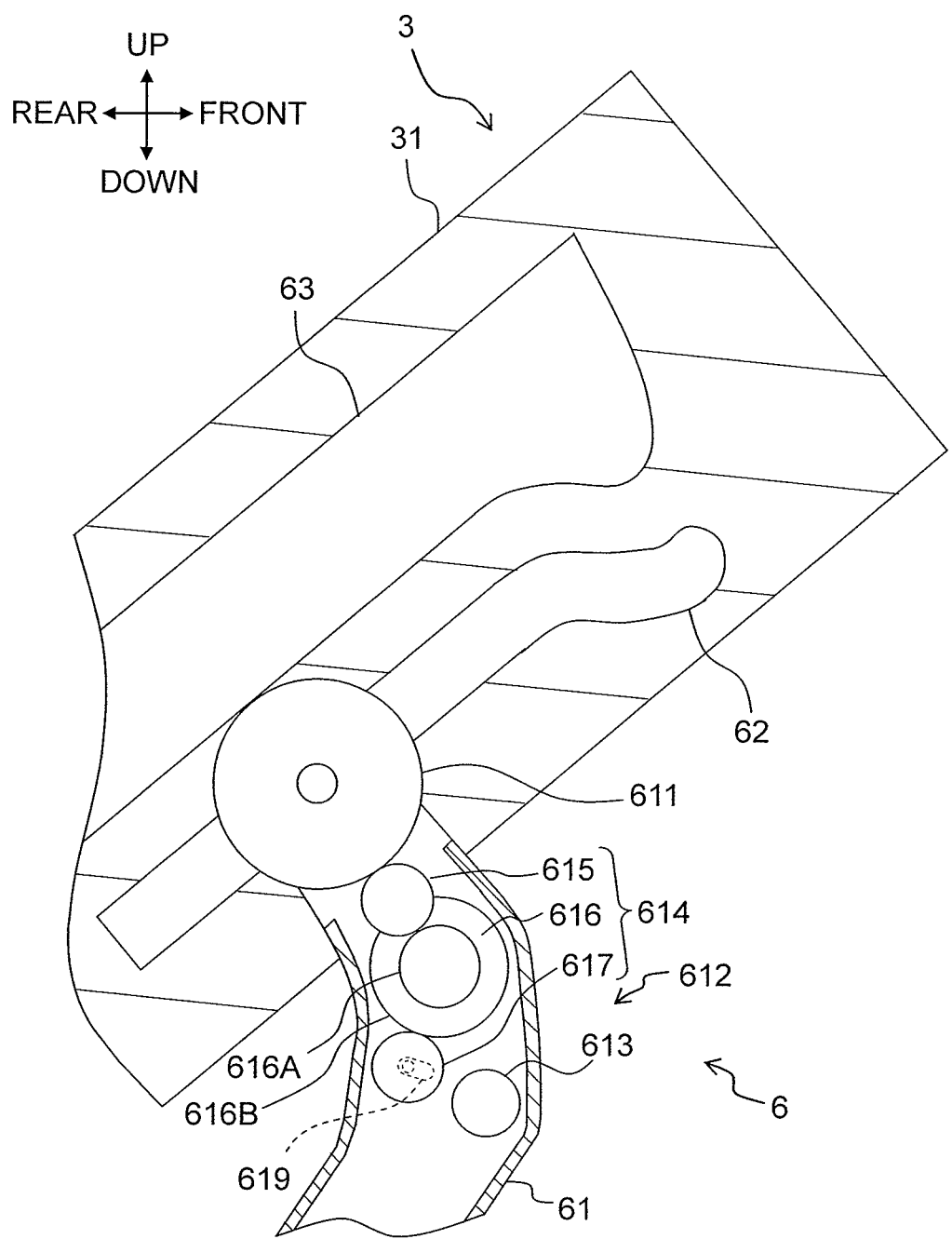

OPENING AND CLOSING APPARATUS AND IMAGE FORMING APPARATUS

CROSS REFERENCE TO RELATED APPLICATION

The present application claims priority from Japanese Patent Application No. 2015-178011 filed on Sep. 9, 2015, the disclosure of which is incorporated herein by reference in the entirety.

BACKGROUND

Field of the Invention

The present invention relates to an opening and closing apparatus configured by pivotably connecting a main body and an openable body (an opening and closing body), and an image forming apparatus provided with the opening and closing apparatus.

Description of the Related Art

There are conventionally known opening and closing apparatuses configured by pivotably connecting a main body and an openable body. Such opening and closing apparatuses are used, for example, in image forming apparatuses such as printers, scanners, and multifunction peripherals.

In some image forming apparatuses, the main body includes an image forming unit and the openable body configured to cover an upper part of the main body includes an image reading unit. A concave-shaped discharge tray is provided on the upper surface of the main body. Moving the openable body upward relative to the main body, that is, opening the openable body makes it easy to take a paper sheet having a small size discharged on an inner part of the discharge tray. In the multifunction peripheral having such a configuration, the openable body is required to close slowly to reduce the impact and sound which would be otherwise caused by closing of the openable body.

For example, there is known an opening and closing apparatus including: an openable body having a rack gear; an arm having a first end connected to a main body and a second end configured to slidably move relative to the rack gear; and a rotating damper accommodated in the arm and configured to apply braking force to the rack gear. In this opening and closing apparatus, the openable body closes slowly due to the braking force of the rotating damper.

SUMMARY

In the above opening and closing apparatus, however, the moment by the self-weight of the openable body gradually increases during closing movement of the openable body from the open position to the closed position. This gradually increases the closing velocity of the openable body. Thus, when the rotating damper having a small load is used, although the closing velocity of the openable body is appropriate at the beginning of the closing movement of the openable body from the open position, the closing velocity becomes too fast just before the closed position.

When the rotating dumper having a large load is used, although the closing velocity of the openable body is appropriate just before the closed position, the closing velocity is too slow at the beginning of the closing movement from the open position. This lengthens the time for closing movement of the openable body, which is unfavorable. Accordingly, it is very difficult to appropriately control the closing velocity of the openable body only by use of the rotating damper.

An object of the present teaching is to provide an opening and closing apparatus in which an openable body moves at a reduced velocity in the vicinity of the closed position during closing movement of the openable body from the open position to the closed position, thereby reaching the closed position slowly.

According to an aspect of the present teaching, there is provided an opening and closing apparatus, including:
a main body;
an openable body configured to pivot between a closed position in which the openable body covers an upper part of the main body and an open position in which the upper part of the main body is open;
a connecting part connecting an end of the main body and an end of the openable body such that the openable body pivots about a pivot axis;
a rack provided in one of the main body and the openable body and extending in a direction orthogonal to the pivot axis; and
an arm having a first end provided with a pinion engaging with the rack, a second end connected to the other of the main body and the openable body such that the arm pivots about the second end, and a braking unit configured to apply braking force to the pinion,
wherein a part, of a pitch line of the rack, which makes contact with a pitch circle of the pinion in a state that the openable body is positioned in a vicinity of the closed position is an inclined line which is inclined to approach the other of the main body and the openable body having no rack, as the inclined line is farther away from the connecting part with the openable body being in the closed position.

In this configuration, since the pitch line of the rack includes the inclined line, the force component in an opening direction is generated when the openable body has reached the vicinity of the closed position during closing movement of the openable body from the open position to the closed position.

According to the present teaching, the force component in the opening direction is generated in the vicinity of the closed position during closing movement of the openable body from the open position to the closed position. This reduces the closing velocity of the openable body in the vicinity of the closed position, so that the openable body reaches the closed position at a low closing velocity.

BRIEF DESCRIPTION OF THE DRAWINGS

FIG. 1 depicts a state in which an image reading unit is in a closed position.

FIG. 2 depicts a state in which the image reading unit is in an open position.

FIG. 3 depicts the state in which the image reading unit is in the open position.

FIG. 4 depicts a state in which the image reading unit is positioned between the open position and the closed position.

FIG. 5 depicts the state in which the image reading unit is in the closed position.

FIG. 6 depicts a state at the start of pivoting of the image reading unit from the open position to the closed position.

FIG. 7 is another partial sectional side view depicting enlarged surroundings of the arm of the multifunction peripheral according to the embodiment of the present teaching, and FIG. 7 depicts a state at the end of pivoting of the image reading unit from the closed position to the open position.

DESCRIPTION OF THE EMBODIMENTS

Figure 1:
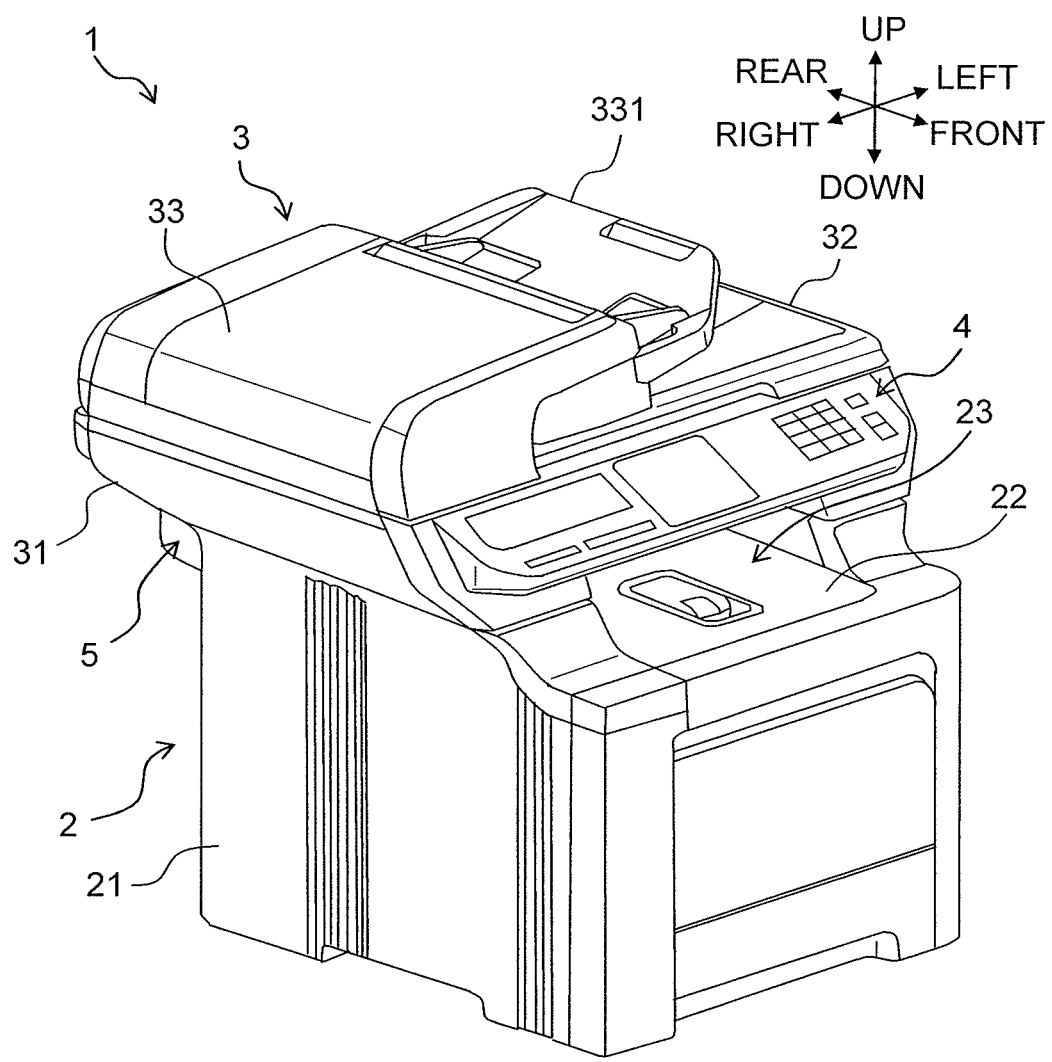
FIG. 1 is a perspective view of a multifunction peripheral according to an embodiment of the present teaching.

An opening and closing apparatus of the present teaching can be used, for example, in image forming apparatuses such as printers, scanners, and multifunction peripherals equipped with the printers and the scanners. In the following embodiments, an explanation will be made about an example in which the opening and closing apparatus of the present teaching is applied to a multifunction peripheral. In the following explanation, a front-rear direction, a left-right direction, and an up-down direction are defined based on the state in which the multifunction peripheral is placed to be usable as depicted in FIG. 1.

<Overall Structure of Multifunction Peripheral>

A multifunction peripheral 1 includes an image forming unit 2 which is an exemplary main body; an image reading unit 3 which is an exemplary openable body; an operation panel 4; a connecting part 5; and an opening and closing mechanism 6. The image reading unit 3 is connected to the image forming unit 2 via the connecting part 5 and the opening and closing mechanism 6 such that the image reading unit 3 is swingable relative to the image forming unit 2 in the up-down direction.

Figure 2:
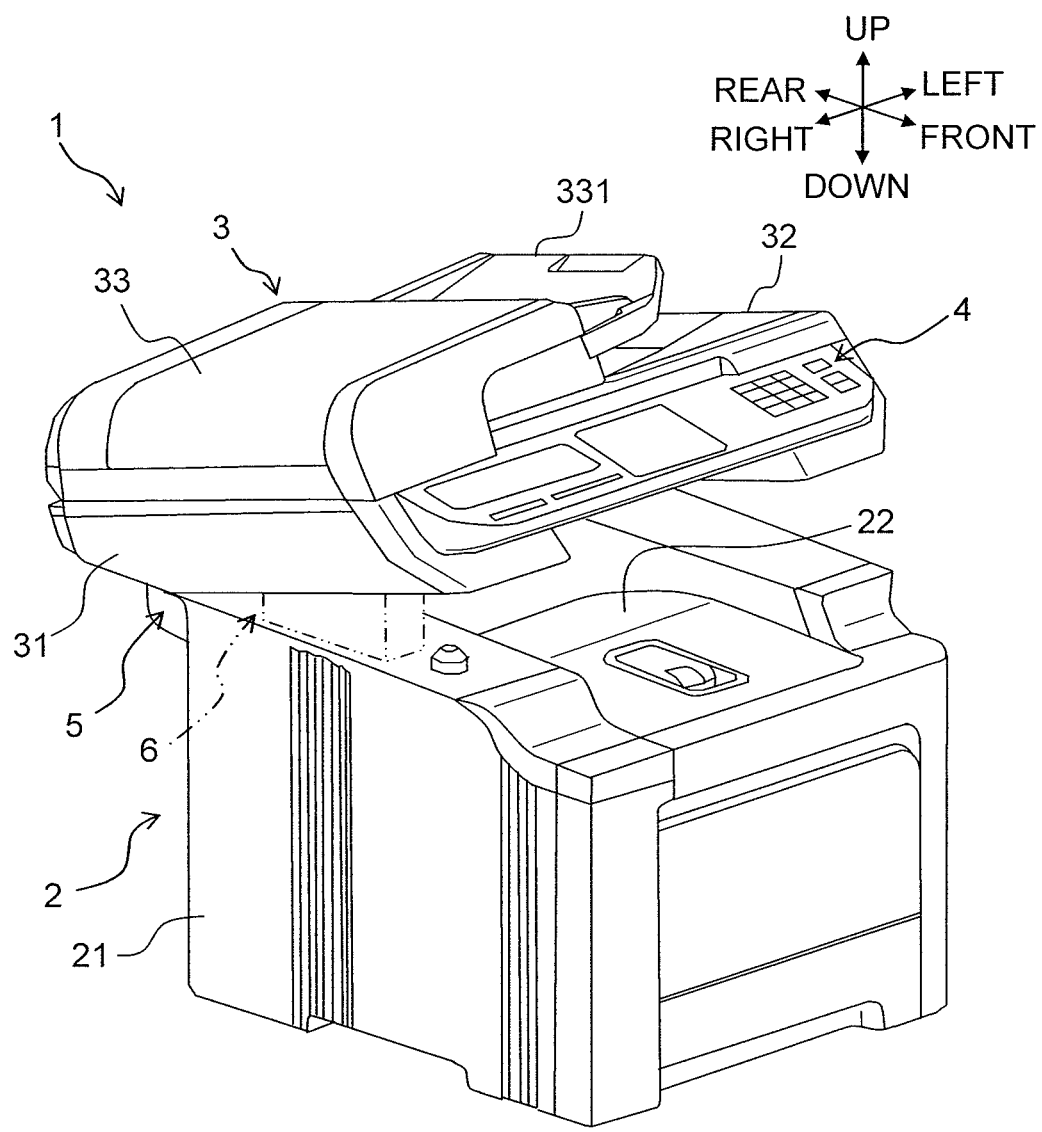
FIG. 2 is another perspective view of the multifunction peripheral according to the embodiment of the present teaching.
Figure 3:
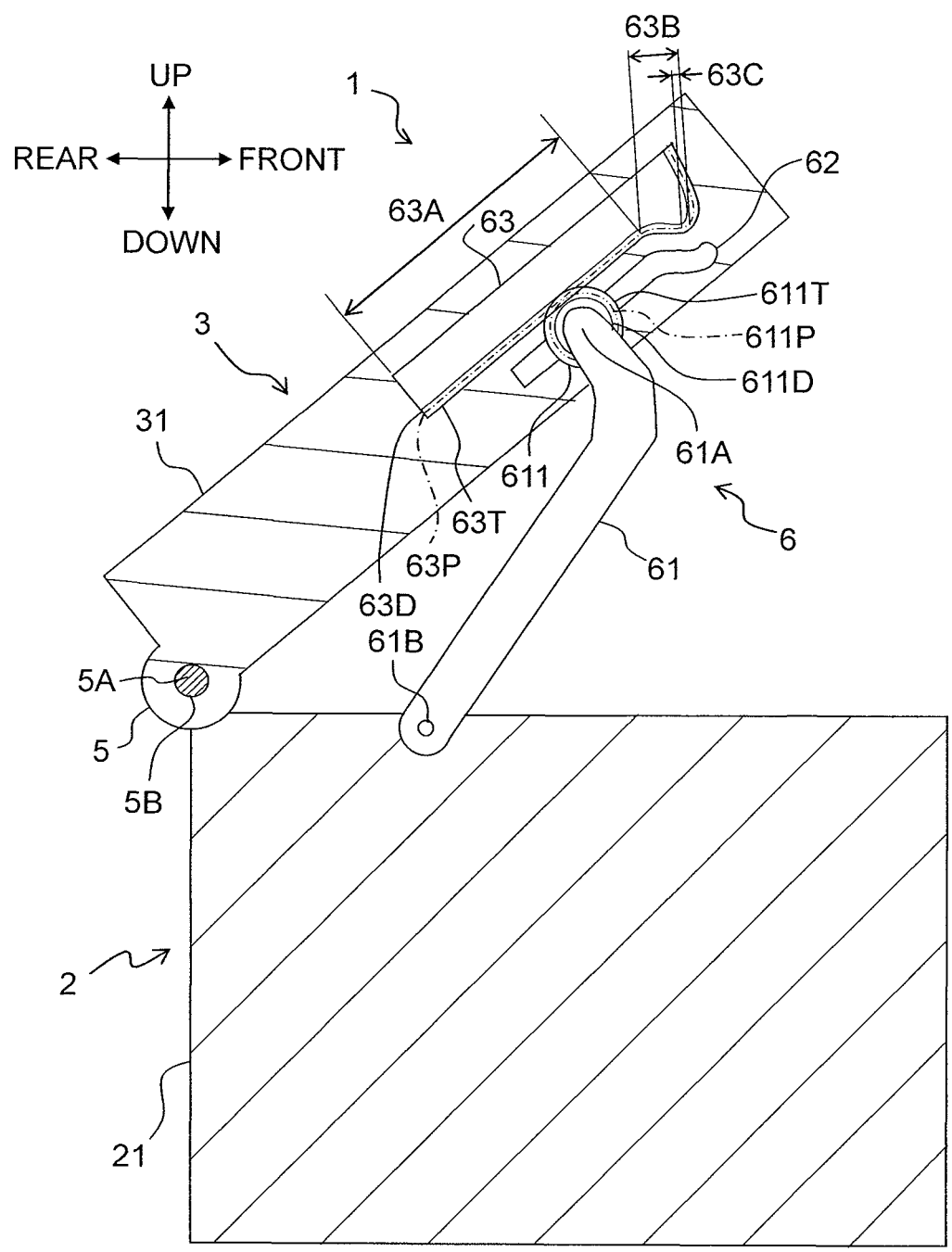
FIG. 3 is a partial sectional side view of the multifunction peripheral according to the embodiment of the present teaching.
Figure 4:
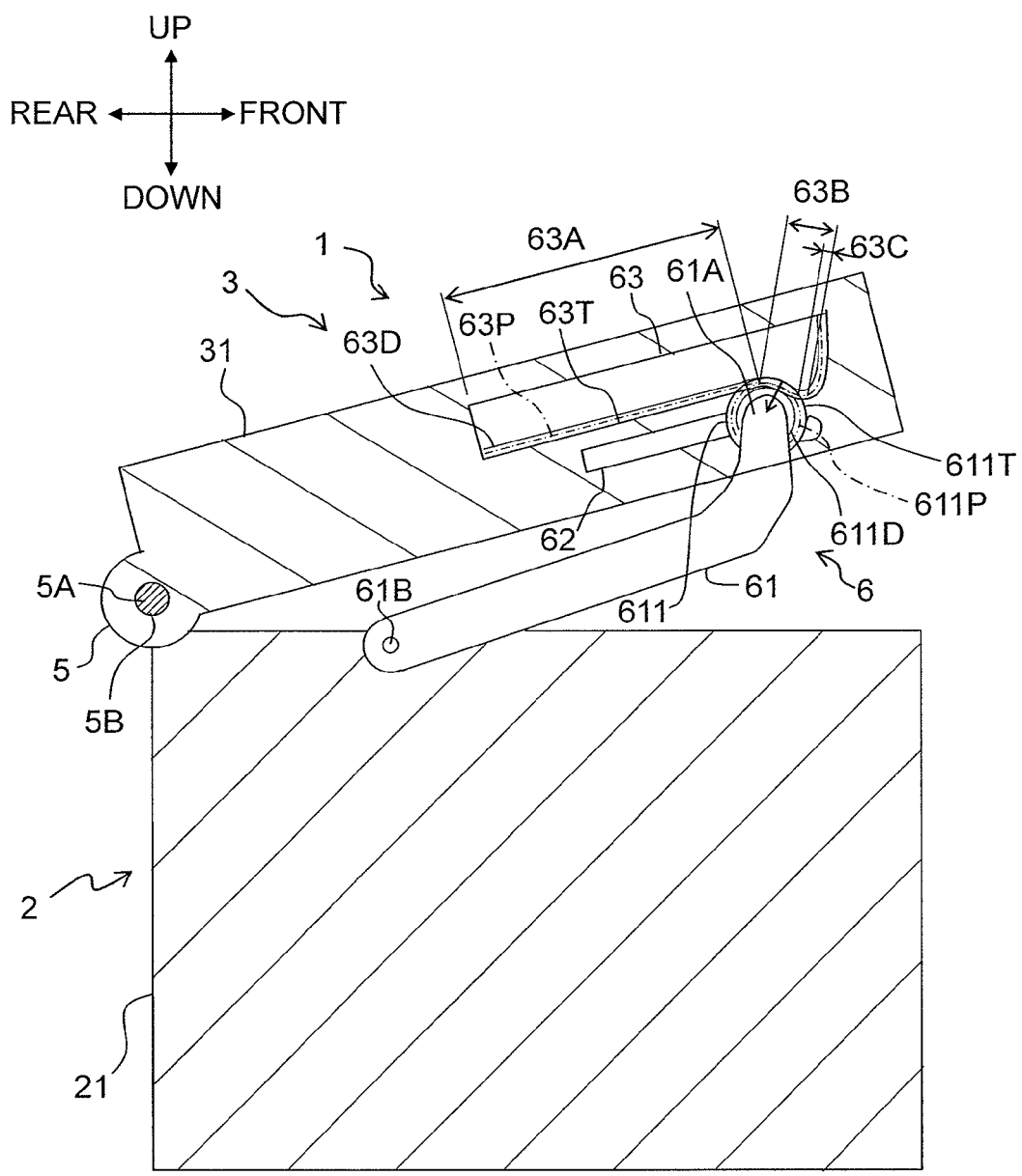
FIG. 4 is another partial sectional side view of the multifunction peripheral according to the embodiment of the present teaching.
Figure 5:
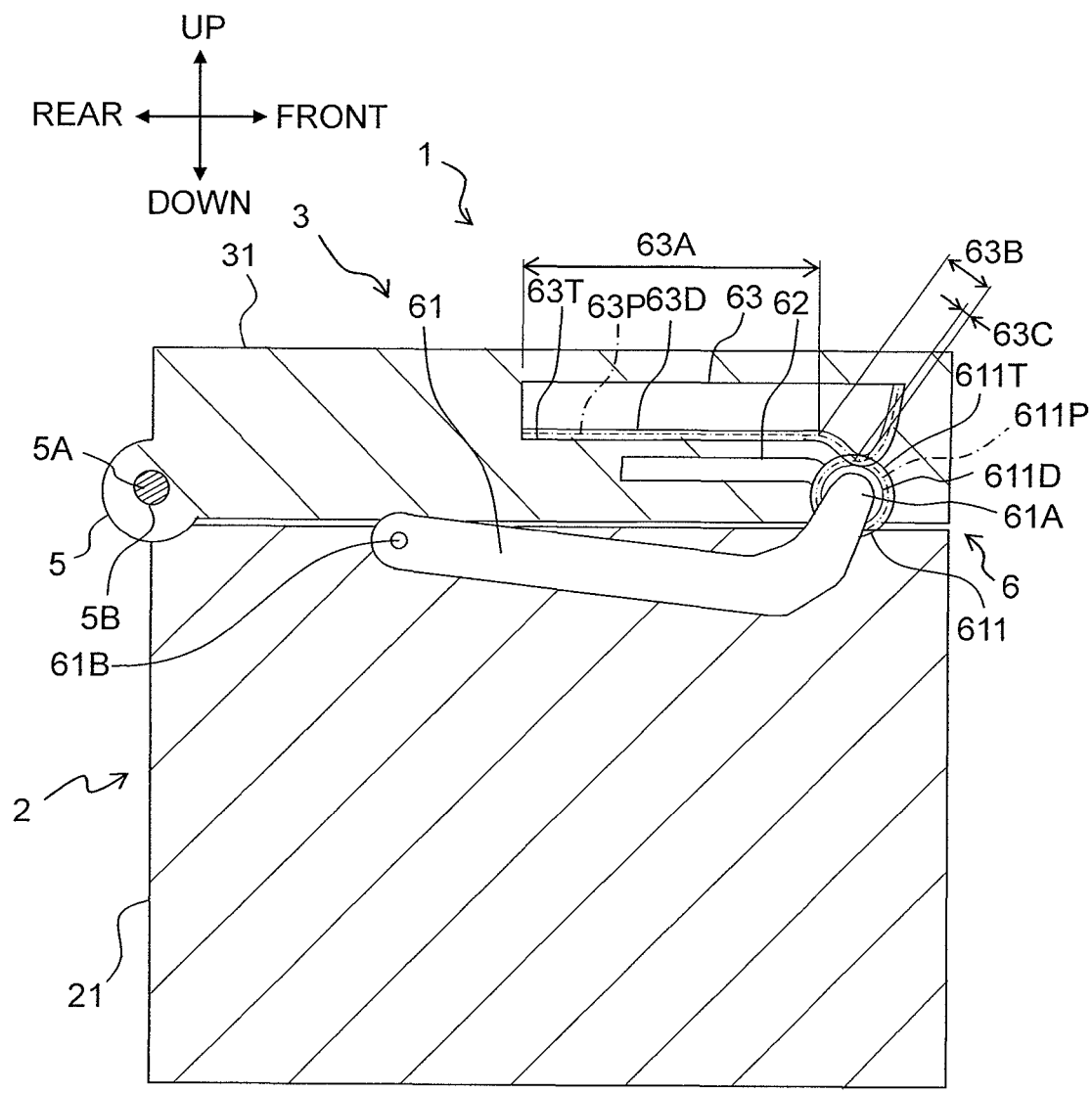
FIG. 5 is still another partial sectional side view of the multifunction peripheral according to the embodiment of the present teaching.

FIG. 2 simply depicts arrangement of the opening and closing mechanism 6. FIGS. 3 to 5 depict a detailed configuration of the opening and closing mechanism 6. In the present description, the position in which the image reading unit 3 remains stationary while covering the upper surface of the image forming unit 2 is referred to as a closed position (a state depicted in FIG. 1) and the position in which the image reading unit 3 remains stationary with the upper surface of the image forming unit 2 open is referred to as an open position (a state depicted in FIG. 2).

The image forming unit 2 includes a casing 21 in a substantially rectangular parallelepiped shape. The casing 21 includes a feed cassette containing paper sheets, a conveyance mechanism conveying a paper sheet from the feed cassette, an image forming part forming an image on the paper sheet conveyed by the conveyance mechanism, and a discharge mechanism conveying the paper sheet from the image forming part to the outside of the casing 21 (those of which are not depicted in the drawings). The configuration of the image forming part is not particularly limited, and it is possible to use an image forming part with an electro-photographic system, an ink-jet system, a thermal head system, or the like.

The multifunction peripheral 1 has a so-called in-body discharge form. The upper surface of the casing 21 is concave or recessed, thereby forming the discharged tray 22 which curves and slopes upward from the rear side toward the front side. As depicted in FIG. 1, an opening for taking out paper sheet 23 (paper taking-out opening 23) is formed between the upper front part of the image forming unit 2 and the lower front part of the image reading unit 3. The paper sheet for which an image has been formed is discharged on the discharge tray 22 from the rear side to the front side by the discharge mechanism.

The image reading unit 3 includes an image reading part (not depicted) reading a document placed on a platen, a casing 31 in a substantially rectangular parallelepiped shape accommodating the image reading part, a document cover 32, and an auto document feeder (ADF) 33.

The image reading part has a so-called flatbed form. The image reading part includes an image sensor reading an image and a driving mechanism driving the image sensor. As the image sensor, it is possible to use, for example, a sensor of a line type in which photodiodes are aligned in the front-rear direction. The driving mechanism is formed of a motor, gears, and the like and moves the image sensor in the left-right direction. Accordingly, the image reading part can read the document placed on the platen while moving the image sensor.

The casing 31 is placed on the image forming unit 2 to cover the upper surface of the discharge tray 22. The upper surface of the casing 31 is covered with a platen glass as the platen on which the document is to be placed. The rear end of the casing 31 is pivotably connected to the rear end of the casing 21 by using the connecting part 5. This configuration allows the image reading unit 3 to pivot about a pivot axis between the closed position and the open position.

The document cover 32 is a plate-shaped member having substantially the same size as the upper surface of the casing 31. The document cover 32 is placed on the casing 31 to cover the platen. The rear end of the document cover 32 is pivotably connected to the rear end of the casing 31 by using a hinge (not depicted).

The ADF 33 is disposed at an upper right part of the document cover 32. The ADF 33 includes a document supply tray 331 and a conveyance mechanism (not depicted). The conveyance mechanism conveys a document placed on the document supply tray 331 and discharges the document, which has passed above the image sensor, on the upper surface of the document cover 32. Accordingly, the image reading unit 3 can automatically read documents one by one.

The operation panel 4 is placed on the front end of the casing 31. The operation panel 4 includes a display such as a liquid crystal panel and an operation part such as a touch panel and operation buttons. The connection part 5 is a hinge configured by engaging a shaft 5A of the casing 21 with a shaft hole 5B of the casing 31. The rear end of the image reading unit 3 is pivotably connected to the rear end of the image forming unit 2 by using the connecting part 5. The rear end of the image reading unit 3 is the base-end of pivoting of the image reading unit 3 relative to the image forming unit 2, and it is referred to as a pivoting base-end.

The pivoting base-end includes the pivot axis about which the image reading unit 3 pivots relative to the image forming unit 2. Meanwhile, the front end of the image reading unit 3 is the front end of pivoting of the image reading unit 3 relative to the image forming unit 2, and it is referred to as a pivoting front-end. The pivoting front-end is an end having the largest pivoting amount during pivoting of the image reading unit 3 relative to the image forming unit 2.

The opening and closing mechanism 6 is disposed at a position between the image forming unit 2 and the image reading unit 3, in the vicinity of the right end, in front of the connecting part 5. The opening and closing mechanism 6 regulates the closing velocity of the image reading unit 3 during pivoting of the image reading unit 3 from the open position to the closed position, that is, during closing movement of the image reading unit 3 relative to the image forming unit 2.

The opening and closing mechanism 6 may be disposed at a position between the image forming unit 2 and the image reading unit 3, in the vicinity of the left end, in front of the connecting part 5. The opening and closing mechanism 6 may include two of opening and closing mechanisms 6 disposed at both left and right ends. When the opening and closing mechanism 6 is disposed at one of the left and right ends, the opening and closing mechanism 6 may be provided on the side where the ADF 33 is provided. By supporting the heavy side at which the ADF 33 is provided, the image reading unit 3 can open and close stably.

In the multifunction peripheral 1 having the above configuration, a user can hold the front end of the document cover 32 to move the document cover 32 upward while holding it. In this case, the user can place a document on the platen with the document cover 32 open. When the user places document(s) on the document supply tray 331 of the ADF 33, the placed document(s) can be automatically read by the image reading unit 3.

It is possible to enlarge the paper taking-out opening 23 by moving the image reading unit 3 to the open position while holding the image reading unit 3. Thus, even when the paper having a small size is discharged on an inner part of the discharge tray 22, the paper having the small size can be taken out easily.

<Configuration of Opening and Closing Apparatus>

The multifunction peripheral 1 includes the opening and closing apparatus. The opening and closing apparatus includes the casing 21 of the image forming unit 2, the casing 31 of the image reading unit 3, the connecting part 5, and the opening and closing mechanism 6.

In FIGS. 3 to 10, the image forming unit 2 and the image reading unit 3 are simplistically depicted in rectangular parallelepiped shapes, respectively. Further, as for a pinion 611 and racks 63, 65 depicted in FIGS. 3 to 5, FIG. 9, and FIG. 10, a tooth tip circle 611T and tooth tip lines 63T, 65T are indicated by solid lines, a pitch circle 611P and pitch lines 63P, 65P are indicated by dashed-dotted lines, a tooth bottom circle 611D and tooth bottom lines 63D, 65D are indicated by thin solid lines. The pitch line 63P of the rack 63 is a line formed by contact points with the pinion 611.

The opening and closing mechanism 6 includes an arm 61, a guide groove 62, and the rack 63.

The arm 61 is a substantially L-shaped member having a first end 61A and a second end 61B. The first end 61A is provided with the pinion 611 engaging with the rack 63. The second end 61B is pivotably connected to the casing 21. The first end 61A rotatably supports the pinion 611. The second end 61B, which is a hinge or the like, is disposed in the vicinity of the upper surface of the casing 21 in front of the connecting part 5. The rotating shaft of the pinion 611 extends leftward and is slidably inserted into the guide groove 62. Thus, the pinion 611 moves along the rack 63 and the arm 61 pivots about the second end 61B according to opening and closing of the image reading unit 3.

Figure 6:
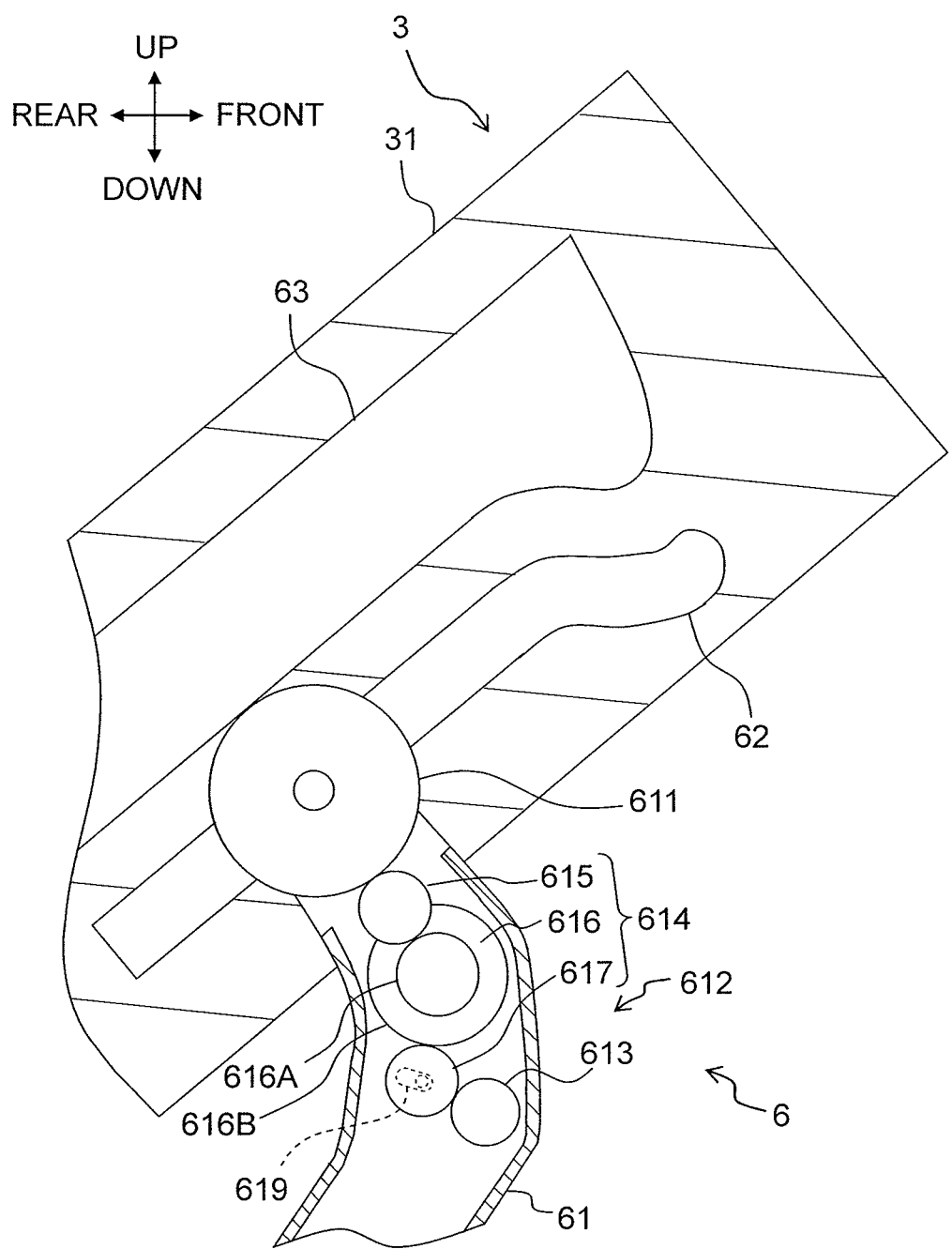
FIG. 6 is a partial sectional side view depicting enlarged surroundings of an arm of the multifunction peripheral according to the embodiment of the present teaching.

As depicted in FIGS. 6 and 7, a braking unit 612 applying braking force to the pinion 611 is provided in the arm 61. Regarding gears depicted in FIGS. 6 and 7, the tooth tip circle 611T, tooth tip line 63T, tooth bottom circle 611D, and tooth bottom line 63D are omitted to make it easy to understand the configuration, and the pitch circle 611P and pitch line 63P are indicated by solid lines.

The braking unit 612 includes a rotating damper 613 generating braking force and a gear unit 614 transmitting the braking force of the rotating damper 613 to the pinion 611.

The rotating damper 613 is rotatably supported by the arm 61. The rotating damper 613 includes, on the outer circumference thereof, a gear engaging with a gear constituting the gear unit 614. Further, the rotating damper 613 includes a rotor (not depicted) therein. The inner space of the rotating damper 613 is filled with viscos fluid. The viscos fluid is a fluid in which various kinds of particles and/or magnetic particles are dispersed in liquid such as silicone oil. In such a configuration, rotation of the rotating damper 613 causes rotation of the rotor, rotation of the rotor causes friction between the rotor and the viscous fluid, and thereby generating the braking force in the rotating damper 613. The braking force is transmitted to the gear unit 614 via the gear of the rotating damper 613.

The gear unit 614 is a gear train formed of three gears 615, 616, and 617 engaging with one another. The three gears 615, 616, and 617 are arranged in the arm 61 from the first end 61A side to the second end 61B side in that order so that they are rotatably supported by the arm 61.

The gear 615 engages with the pinion 611. The gear 616, which is a multistage gear, is an exemplary accelerating gear. The gear 616 is formed of two gears 616A and 616B which have the same shaft and are disposed next to each other in a thrust direction. The gear 616A engages with the gear 615. The gear 616B engages with the gear 617. The diameter of the gear 616A is smaller than that of the gear 616B. The number of teeth of the gear 616A is smaller than that of the gear 616B. Thus, the tangential velocity of the gear 616B is faster than that of the gear 616A.

The torque of the gear 616A is the same as that of the gear 616B. The diameter of the gear 616B is larger than that of the gear 616A. Thus, the force of the gear 616B relative to the gear 617 in a tangential direction is smaller than the force of the gear 616A relative to the gear 617 in the tangential direction when assuming that the gear 616A engages with the gear 617.

Thus, the gear 616 is the accelerating gear which makes the rotation velocity of the rotating damper 613 faster than the rotation velocity of the pinion 611. Arranging the accelerating gear in the gear unit 614 as described above can provide sufficient braking force, even when the rotating damper filled with a low viscosity fluid is used.

The gear 617 is an exemplary separable part. The rotating shaft of the gear 617 is inserted into a groove 619 formed in the inner surface of the arm 61 and is movably supported by the groove 619. The groove 619 extends in a circumferential direction of a circle centering on the rotating shaft of the gear 616. A first end of the groove 619 is farther away from the rotating damper 613 than a second end thereof. Namely, the gear 617 is joined to or separated from the rotating damper 613 by movement of the rotating shaft of the gear 617 along the groove 619.

Since the gear 617 engages with the gear 616B, the gear 617 rotates centering on the rotating shaft of the gear 617 and rotates around the gear 616B while being engaging with the gear 616B along with rotation of the gear 616B. Namely, the gear 617 is a planet gear of which sun gear is the gear 616B.

As depicted in FIG. 6, the gear 617 engages with the rotating dumber 613 in a state that the rotating shaft of the gear 617 is positioned at the second end, of the groove 619, which is close to the rotating dumber 613. On the other hand, as depicted in FIG. 7, the gear 617 is separate from the rotating damper 613 in a state that the rotating shaft of the gear 617 is positioned at the first end, of the groove 619, which is away from the rotating damper 613.

The braking force of the rotating damper 613 is transmitted to the gear 617 in a state that the gear 617 engages with the rotating damper 613. In this situation, the braking force of the rotating damper 613 is transmitted to the gear 617, the gear 616, the gear 615, the pinion 611, and the rack 63 in that order. The breaking force of the rotating damper 613 is not transmitted to the gear 617 in a state that the gear 617 is separate from the rotating damper 613. In this situation, no braking force is transmitted to the pinion 611.

As described above, the gear unit 614 includes the separable part which is joined to the rotating damper 613 when the image reading unit 3 pivots from the open position to the closed position and is separated from the rotating damper 613 when the image reading unit 3 pivots from the closed position to the open position. In this embodiment, the separable part is the planet gear 617 joined to and separated from the rotating damper 613. The present teaching, however, is not limited to such a configuration, and may adopt any mechanism.

As depicted in FIGS. 3 to 5, the guide groove 62 is an elongated hole which slidably supports the rotating shaft of the pinion 611. The guide groove 62 is formed along the pitch line 63P of the rack 63 below the rack 63 of the casing 31. The guide groove 62 guides the rotating shaft of the pinion 611 when the pinion 611 moves along the rack 63 according to opening and closing of the image reading unit 3. Thus, the pinion 611 can stably move along the rack 63.

The rack 63 is fixed to the casing 31 in a state that each tooth tip faces the image forming unit 2. The rack 63 extends in the front-rear direction orthogonal to the pivot axis of the image reading unit 3. In other words, the rack 63 extends in a radial direction from the pivoting base-end toward the pivoting front-end of the image reading unit 3. The front end of the rack 63, which is opposite to the connecting part 5, is positioned closer to the front end of the image reading unit 3 than to the barycentric position of the image reading unit 3.

The pitch line 63P of the rack 63 includes a horizontal line 63A and an inclined line 63B connected to the horizontal line 63A smoothly. The horizontal line 63A is a part, of the pitch line 63P of the rack 63, which makes contact with the pitch circle 611P of the pinion 611 during pivoting of the image reading unit 3 from the open position to the vicinity of the closed position. The horizontal line 63A is horizontal in a state that the image reading unit 3 is in the closed position.

The inclined line 63B is a part, of the pitch line 63P of the rack 63, which makes contact with the pitch circle 611P of the pinion 611 in a state that the image reading unit 3 is positioned in the vicinity of the closed position (including the state depicted in FIG. 4). The inclined line 63B is an inclined line which is inclined to approach the image forming unit 2 as the inclined line 63B is farther away from the connecting part 5, that is, from the rear side to the front side, in the state that the image reading unit 3 is in the closed position. The front end of the inclined line 63B is a gentle inclined line 63C having a gentle inclination.

The inclined line 63B can be regarded as an inclined line which is inclined from the rear side to the front side to approach the pinion 611. Further, the inclined line 63B can be regarded as an inclined line which is inclined to become lower from the rear side to the front side in the state that the image reading unit 3 is in the closed position. Furthermore, the inclined line 63B can be regarded as an inclined line in which its front part is positioned lower than its rear part in a vertical direction in the state that the image reading unit 3 is positioned in the closed position.

The inclined line 63B can be explained from another viewpoint. Namely, a straight line (arrow A of FIG. 4), which extends from a contact point between the rack 63 and the pinion 611 toward the rotation center of the pinion 611, is inclined toward the connecting part 5 in a state that the image reading unit 3 is positioned in the vicinity of the closed position.

<Movement of Opening and Closing Apparatus>

Subsequently, an explanation will be made about a closing movement of the image reading unit 3, that is, pivoting of the image reading unit 3 from the open position to the closed position.

Figure 8A:
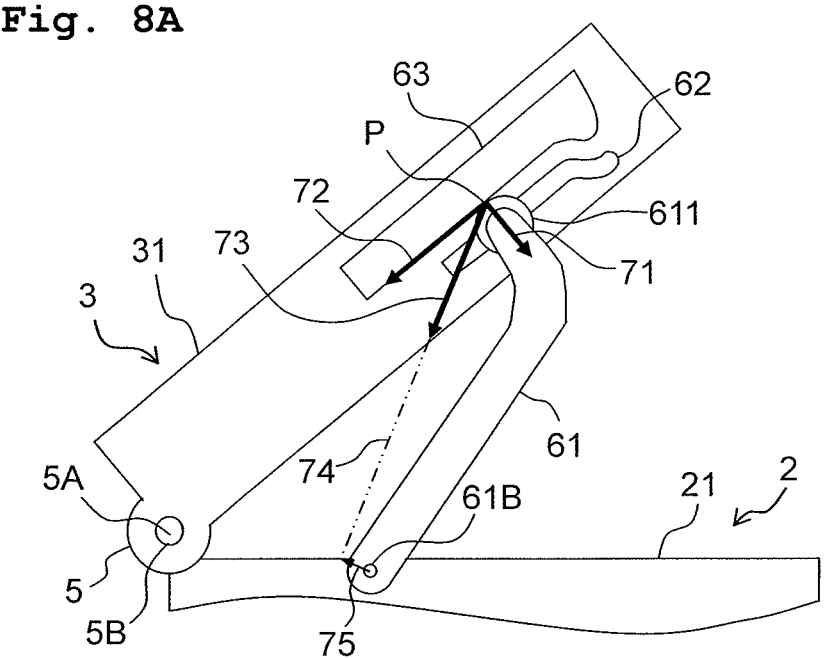
FIG. 8A depicts a state at the start of pivoting of the image reading unit from the open position to the closed position.
Figure 8B:
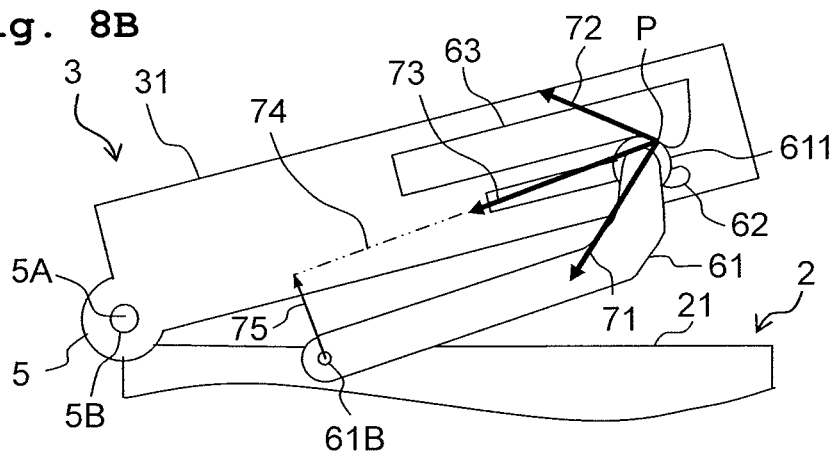
FIG. 8B depicts a state in the middle of pivoting of the image reading unit from the open position to the closed position, in particular, a state in which the image reading unit is positioned in the vicinity of the closed position.
Figure 8C:
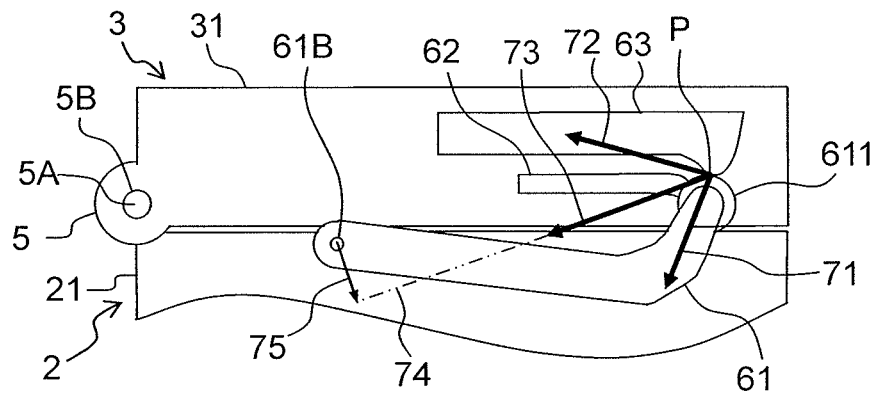
FIG. 8C depicts a state just before the end of pivoting of the image reading unit from the open position to the closed position.

Regarding each of the pinion 611 and the rack 63 depicted in FIGS. 8A to 8C, the tooth tip circle 611T, tooth tip line 63T, tooth bottom circle 611D, and tooth bottom line 63D are omitted to make it easy to understand the configuration, and the pitch circle 611P and pitch line 63P are indicated by solid lines.

Pushing the upper surface of the image reading unit 3 by the user in a state that the image reading unit 3 remains stationary in the open position causes pivoting of the image reading unit 3 from the open position to the closed position. Once pivoting starts, the image reading unit 3 automatically pivots to the closed position owing to its own weight. At the beginning of the pivoting, force indicated by arrows in FIG. 8A acts. Namely, a moment 71 caused by the self-weight of the image reading unit 3 and a braking force 72 caused by the braking unit 612 act, thereby generating a pivoting force 73 which is resultant force of the moment 71 and the braking force 72 to actually pivot the image reading unit 3.

The moment 71 is the force from the contact point P between the rack 63 and the pinion 611 toward the rotation center of the pinion 611. The braking force 72 is the force going from the contact point P toward the rear side in a moving direction of the pinion 611 along the tangential line. The pivoting force 73 is the resultant force of the moment 71 and the braking force 72 extending from the contact point P.

A virtual line 74, which extends in a direction of the pivoting force 73 and is indicated by a dashed-two dotted line in FIG. 8A, passes through the casing 21 between the connecting part 5 and the second end 61B which is the pivoting center of the arm 61. In other words, the virtual line 74 passes behind the second end 61B. The direction of a perpendicular line 75, which extends from the second end 61B to be orthogonal to the virtual line 74, shows or represents the direction of force acting on the arm 61 due to the moment 71 and the braking force 72. In FIG. 8A, the perpendicular line 75 extends upward relative to the horizontal, namely, the perpendicular line 75 extends in an opening direction of the image reading unit 3. Thus, the inertia force of the image reading unit 3 in a closing direction is weakened by the force in the opening direction, which allows the image reading unit 3 to close slowly at the beginning of the pivoting from the open position.

During the process ranging from FIG. 8A to FIG. 8B, the braking force 72 has no change, but the moment 71 gradually increases. Thus, the closing velocity of the image reading unit 3 gradually increases.

When the image reading unit 3 has reached the position depicted in FIG. 8B, the pinion 611 makes contact with the inclined line 63B of the rack 63. In this situation, the moment 71 is inclined toward the second end 61B and the braking force 72 acts upward relative to the horizontal. Thus, the virtual line 74 extending in the direction of the pivoting force 73 is spaced farther away from the second end 61B, which is the pivoting center of the arm 61 than the virtual line 74 depicted in FIG. 8A.

In the situation depicted in FIG. 8B, the perpendicular line 75 extends upward relative to the horizontal and is longer than the perpendicular line 75 depicted in FIG. 8A. Namely, the force acting in the opening direction of the image reading unit 3 increases. As a result, the inertia force of the image reading unit 3 in the closing direction is weakened by the great force in the opening direction, thereby decreasing the closing velocity of the image reading unit 3 in the vicinity of the closed position. That is, when the pinion 611 has reached the inclined line 63B of the rack 63, the closing velocity of the image reading unit 3 decreases.

When the image reading unit 3 has reached the position depicted in FIG. 8C, the pinion 611 makes contact with the gentle inclined line 63C of the rack 63. In this situation, similar to the situation depicted in FIG. 8B, the moment 71 is inclined toward the second end 61B and the braking force 72 acts upward relative to the horizontal. The inclination angle of the braking force 72, however, is smaller than that depicted in FIG. 8B. Thus, the virtual line 74 extending in the direction of the pivoting force 73 passes in front of the second end 61B which is the pivoting center of the arm 61.

In the situation depicted in FIG. 8C, the perpendicular line 75 extends downward relative to the horizontal, namely the perpendicular line 75 extends in the closing direction of the image reading unit 3. Thus, the inertia force of the image reading unit 3 in the closing direction is strengthened by the force acting in the closing direction, thereby increasing the closing velocity of the image reading unit 3 just before the end of pivoting from the open position. This allows the image reading unit 3 to reliably reach the closed position. Accordingly, the image reading unit 3 is completely closed.

<First Modified Embodiment>

Figure 9:
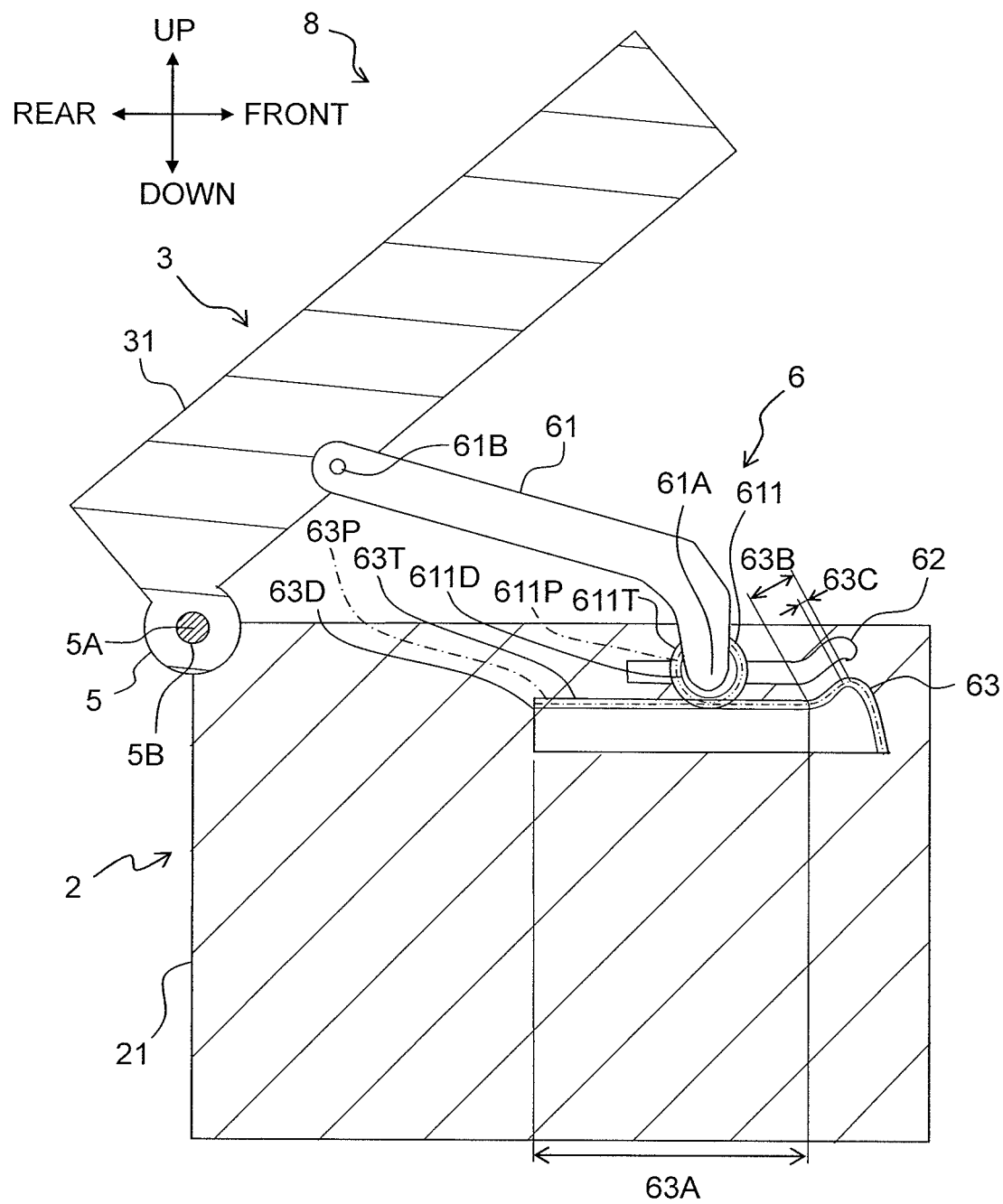
FIG. 9 is a partial sectional side view of a multifunction peripheral according to a modified embodiment of the present teaching.

In the above embodiment, the rack 63 is provided in the image reading unit 3 and the second end 61B of the arm 61 is connected to the image forming unit 2. The rack 63, however, may be provided in the image forming unit 2 and the second end 61B of the arm 61 may be connected to the image reading unit 3. This configuration is regarded as the first modified embodiment, and FIG. 9 depicts a partial sectional side view of a multifunction peripheral according to the first modified embodiment. In FIG. 9, the constitutive parts or components, which are the same as or equivalent to those of the embodiment described above, are designated by the same reference numerals, any explanation of which will be omitted as appropriate.

A multifunction peripheral 8 of the first modified embodiment includes an image forming unit 2, an image reading unit 3, an operation panel (not depicted), a connecting part 5, and an opening and closing mechanism 6. The opening and closing mechanism 6 includes an arm 61, a guide groove 62, and a rack 63.

The arm 61 is a substantially L-shaped member having a first end 61A and a second end 61B. The first end 61A is provided with a pinion 611 engaging with the rack 63. The second end 61B is pivotably connected to a casing 31. The first end 61A rotatably supports the pinion 611. The second end 61B is disposed in the vicinity of the lower surface of the casing 31 in front of the connecting part 5. The rotating shaft of the pinion 611 extends leftward and is slidably inserted into the guide groove 62. Thus, the pinion 611 moves along the rack 63 and the arm 61 pivots about the second end 61B according to opening and closing of the image reading unit 3.

The guide groove 62 is formed along a pitch line 63P of the rack 63 above the rack 63 of a casing 21. The guide groove 62 is an elongated hole which slidably supports the rotating shaft of the pinion 611. The guide groove 62 guides the rotating shaft of the pinion 611 when the pinion 611 moves along the rack 63 according to opening and closing of the image reading unit 3.

The rack 63 is fixed to the casing 21 in a state that each tooth tip faces the image reading unit 3. The rack 63 extends in the front-rear direction orthogonal to the pivot axis of the image reading unit 3. The front end of the rack 63, which is opposite to the connecting part 5, is positioned closer to the front end of the image forming unit 2 than to the barycentric position of the image forming unit 2.

The pitch line 63P of the rack 63 includes a horizontal line 63A and an inclined line 63B connected to the horizontal line 63A smoothly. The horizontal line 63A is a part, of the pitch line 63P of the rack 63, which makes contact with a pitch circle of the pinion 611 during pivoting of the image reading unit 3 from the open position to the vicinity of the closed position. The horizontal line 63A is horizontal in a state that the image reading unit 3 is in the closed position.

The inclined line 63B is a part, of the pitch line 63P of the rack 63, which makes contact with the pitch circle of the pinion 611 in a state that the image reading unit 3 is positioned in the vicinity of the closed position. The inclined line 63B is an inclined line which is inclined to approach the image reading unit 3 as the inclined line 63B is farther away from the connecting part 5, that is, from the rear side to the front side, in the state that the image reading unit 3 is in the closed position. The front end of the inclined line 63B is a gentle inclined line 63C having a gentle inclination.

The inclined line 63B can be regarded as an inclined line which is inclined to become higher from the rear side toward the front side in the state that the image reading unit 3 is in the closed position. Further, the inclined line 63B can be regarded as an inclined line in which its front part is positioned higher than its rear part in a vertical direction in the state that the image reading unit 3 is positioned in the closed position.

In the multifunction peripheral 8 of the first modified embodiment, when the image reading unit 3 pivots from the open position to the closed position, the closing velocity of the image reading unit 3 decreases in the vicinity of the closed position, similar to the above embodiment.

<Second Modified Embodiment>

Figure 10:
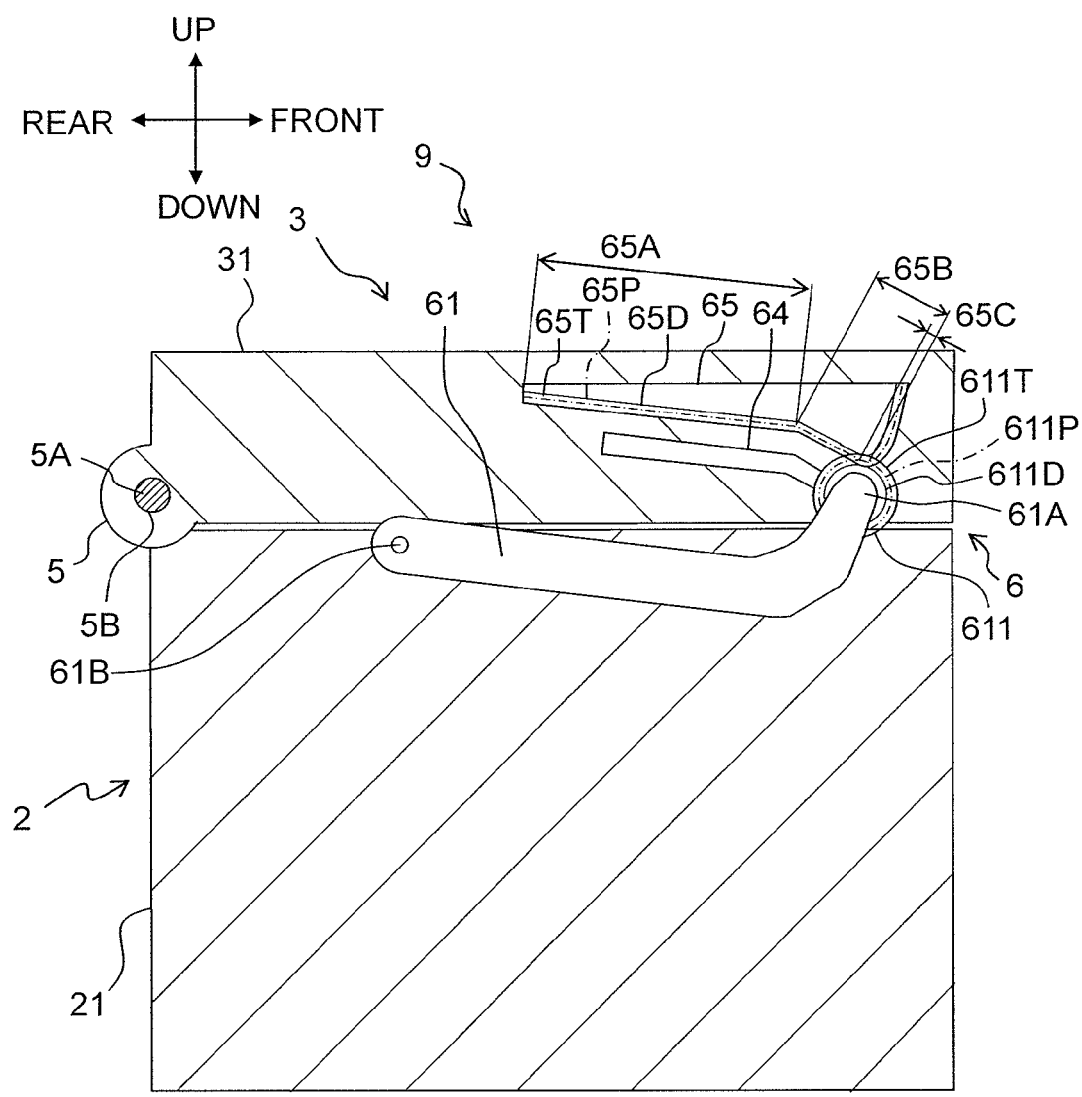
FIG. 10 is a partial sectional side view of a multifunction peripheral according to another modified embodiment of the present teaching.

In the above embodiment, the pitch line 63P of the rack 63 includes the horizontal line 63A. However, the pitch line 63P of the rack 63 may not include the horizontal line 63A. This configuration is regarded as the second modified embodiment, and FIG. 10 depicts a partial sectional side view of a multifunction peripheral 9 according to the second modified embodiment. In FIG. 10, the constitutive parts or components, which are the same as or equivalent to those of the embodiment described above, are designated by the same reference numerals, any explanation of which will be omitted as appropriate.

The multifunction peripheral 9 of the second modified embodiment includes an image forming unit 2, an image reading unit 3, an operation panel (not depicted), a connecting part 5, and an opening and closing mechanism 6. The opening and closing mechanism 6 includes an arm 61, a guide groove 64, and a rack 65.

The guide groove 64 is formed along a pitch line 65P of the rack 65 below the rack 65 of a casing 31. The guide groove 64 is an elongated hole which slidably supports the rotating shaft of a pinion 611. The guide groove 64 guides the rotating shaft of the pinion 611 when the pinion 611 moves along the rack 65 according to opening and closing of the image reading unit 3.

The rack 65 is fixed to the casing 31 in a state that each tooth tip faces the image forming unit 2. The rack 65 extends in the front-rear direction orthogonal to the pivot axis. The front end of the rack 65, which is opposite to the connecting part 5, is positioned closer to the front end of the image reading unit 3 than to the barycentric position of the image reading unit 3.

The pitch line 65P of the rack 65 includes a first inclined line 65A and a second inclined line 65B connected to the first inclined line 65A smoothly. The first inclined line 65A is a part, of the pitch line 65P of the rack 65, which makes contact with a pitch circle of the pinion 611 during pivoting of the image reading unit 3 from the open position to the vicinity of the closed position. The first inclined line 65A is an inclined line which is inclined to approach the image forming unit 2 as the first inclined line 65A is farther away from the connecting part 5, that is, from the rear side to the front side, in a state that the image reading unit 3 is in the closed position.

The second inclined line 65B is a part, of the pitch line 65P of the rack 65, which makes contact with the pitch circle of the pinion 611 in a state that the image reading unit 3 is positioned in the vicinity of the closed position. The second inclined line 65B is an inclined line which is inclined to approach the image forming unit 2 as the second inclined line 65B is farther away from the connecting part 5, that is, from the rear side to the front side, in the state that the image reading unit 3 is in the closed position. The second inclined line 65B is steeper than the first inclined line 65A. Note that the front end of the second inclined line 65B is a gentle inclined line 65C having a gentle inclination.

In the multifunction peripheral 9 of the second modified embodiment, when the image reading unit 3 pivots from the open position to the closed position, it is possible to reduce the closing velocity of the image reading unit 3 in a range from the beginning of the pivoting to the vicinity of the closed position. The closing velocity of the image reading unit 3 can be reduced further in the vicinity of the closed position.

<Effects of the Embodiments>

The following summarizes all of the above embodiments. The opening and closing apparatus includes the image forming unit 2; the image reading unit 3 pivoting between the closed position in which the image reading unit 3 covers the upper part of the image forming unit 2 and the open position in which the upper part of the image forming unit 2 is open; the connecting part 5 connecting an end of the image forming unit 2 and an end of the image reading unit 3 such that the image reading unit 3 pivots about a pivot axis; the rack 63 or 65 being provided in one of the image reading unit 3 and the image forming unit 2 and extending in the direction orthogonal to the pivot axis; and the arm 61 having the first end 61A provided with the pinion 611 engaging with the rack 63 or 65, the second end 61B connected to the other of the image reading unit 3 and the image forming unit 2 having no rack 63 or 65 such that the arm pivots about the second end 61B, and the braking unit 612 applying the braking force to the pinion 611. A part, of the pitch line 63P or 65P of the rack 63 or 65, which makes contact with the pitch circle 611P of the pinion 611 at least in a state that the image reading unit 3 is positioned in the vicinity of the closed position is an inclined line which is inclined to approach the other of the image reading unit 3 and the image forming unit 2 having no rack 63 or 65 as the inclined line is farther away from the connecting part 5 in the state that the image reading unit 3 is in the closed position.

In this configuration, the pitch line 63P or 65P of the rack 63 or 65 includes the inclined line 63B or 65B. Thus, when the image reading unit 3 has reached the vicinity of the closed position during its closing movement, the force component in the opening direction is generated. As a result, the closing velocity of the image reading unit 3 decreases in the vicinity of the closed position, so that the image reading unit 3 reaches the closed position at a low closing velocity.

In the above embodiment, a part, of the pitch line 63P of the rack 63, which makes contact with the pitch circle 611P of the pinion 611 during pivoting of the image reading unit 3 from the open position to the vicinity of the closed position, is the horizontal line 63A in the state that the image reading unit 3 is in the closed position.

In this configuration, the pitch line 63P of the rack 63 includes the horizontal line 63A and the inclined line 63B. Thus, the closing velocity of the image reading unit 3 can be reduced only when the image reading unit 3 has reached the vicinity of the closed position during the closing movement. The horizontal line 63A can reduce the thickness of the rack 63, thereby making it possible to reduce a space for the rack 63.

In the above embodiment, the braking unit 612 includes the rotating damper 613 generating braking force and the gear unit 614 transmitting the braking force of the rotating damper 613 to the pinion 611. The gear unit 614 includes the separable part which is joined to the rotating damper 613 when the image reading unit 3 pivots from the open position to the closed position and is separated from the rotating damper 613 when the image reading unit 3 pivots from the closed position to the open position.

In this configuration, the braking force of the rotating damper 613 acts on closing movement of the image reading unit 3, thereby reducing the closing velocity of the image reading unit 3. On the other hand, no braking force of the rotating damper 613 acts on opening movement of the image reading unit 3, and thus the user can open the image reading unit 3 easily, which is user friendly.

In the above embodiment, the separable part is the planet gear 617 which is joined to and separated from the rotating damper 613. Using the planet gear 617 as the separable part results in a simple structure.

In the above embodiment, the gear unit 614 includes the accelerating gear 616 which makes the rotation velocity of the rotating damper 613 faster than the rotation velocity of the pinion 611. The accelerating gear 616 provides sufficient braking force even when the rotating damper 613 filled with a low viscosity fluid is used.

In the multifunction peripheral 1 of the above embodiment, the rack 63 is provided in the image reading unit 3. In this configuration, if the second end 61B of the arm 61 is positioned closer to the connecting part 5, the arm 61 is less likely to obstruct the user.

In the multifunction peripheral 1 of the above embodiment, the end of the rack 63 opposite to the connecting part 5 is positioned closer to the end of the image reading unit 3 opposite to the connecting part 5, than to the barycentric position of the image reading unit 3. This configuration can reduce the load on the arm 61.

In the above embodiment, the image reading unit 3 or the image forming unit 2 provided with the rack 63 or 65 includes the guide groove 62 or 64 which guides the rotating shaft of the pinion 611 along the pitch line 63P or 65P of the rack 63 or 65. The guide groove 62 or 64 can stably move the pinion 611 along the rack 63 or 65.

As described in the above embodiments, in the opening and closing apparatus, the straight line (arrow A of FIG. 4), which extends from the contact point P between the rack 63 or 65 and the pinion 611 toward the rotation center of the pinion 611, is inclined toward the connecting part 5 at least in a state that the image reading unit 3 is positioned in the vicinity of the closed position. In this configuration, since the straight line is inclined toward the connecting part 5, when the image reading unit 3 has reached the vicinity of the closed position during its closing movement, the force component in the opening direction is generated. As a result, the closing velocity of the image reading unit 3 decreases in the vicinity of the closed position, so that the image reading unit 3 reaches the closed position at a low closing velocity.

What is claimed is:

1. An opening and closing apparatus, comprising:
    a main body;
    an openable body configured to pivot between a closed position in which the openable body covers an upper part of the main body and an open position in which the upper part of the main body is open;
    a connecting part connecting an end of the main body and an end of the openable body such that the openable body pivots about a pivot axis;
    a rack provided in one of the main body and the openable body and extending in a direction orthogonal to the pivot axis; and
    an arm having a first end provided with a pinion engaging with the rack, a second end connected to the other one of the main body and the openable body such that the arm pivots about the second end, and a braking unit configured to apply braking force to the pinion,
    wherein a part, of a pitch line of the rack, which makes contact with a pitch circle of the pinion in a state that the openable body is positioned in a vicinity of the closed position is an inclined line which is inclined to approach the other one of the main body and the openable body having no rack, as the inclined line is farther away from the connecting part with the openable body being in the closed position.

2. The opening and closing apparatus according to claim 1, wherein a part, of the pitch line of the rack, which makes contact with the pitch circle of the pinion during pivoting of the openable body from the open position to the vicinity of the closed position, is a horizontal line in the state that the openable body is in the closed position.

3. The opening and closing apparatus according to claim 1, wherein the braking unit includes a rotating damper configured to generate the braking force and a gear unit configured to transmit the braking force of the rotating damper to the pinion, and
    the gear unit includes a separable part which is configured to be joined to the rotating damper in a case that the openable body pivots from the open position to the closed position and is configured to be separated from the rotating damper in a case that the openable body pivots from the closed position to the open position.

4. The opening and closing apparatus according to claim 3, wherein the separable part includes a planet gear configured to be joined to and separated from the rotating damper.

5. The opening and closing apparatus according to claim 3, wherein the gear unit includes an accelerating gear configured to make rotation velocity of the rotating damper faster than rotation velocity of the pinion.

6. The opening and closing apparatus according to claim 5, wherein the accelerating gear is a sun gear of the planet gear.

7. The opening and closing apparatus according to claim 1, wherein the rack is provided in the openable body.

8. The opening and closing apparatus according to claim 7, wherein an end of the rack opposite to the connecting part is positioned closer to an end of the openable body opposite to the connecting part than to a barycentric position of the openable body.

9. The opening and closing apparatus according to claim 1, wherein one of the main body and the openable body provided with the rack includes a guide groove configured to guide a rotating shaft of the pinion along the pitch line of the rack.

10. An image forming apparatus comprising:
    the opening and closing apparatus as defined in claim 1; and
    an image forming unit provided in the main body.

11. An opening and closing apparatus, comprising:
    a main body;
    an openable body configured to pivot between a closed position in which the openable body covers an upper part of the main body and an open position in which the upper part of the main body is open;
    a connecting part connecting an end of the main body and an end of the openable body such that the openable body pivots about a pivot axis;
    a rack provided in one of the main body and the openable body and extending in a direction orthogonal to the pivot axis; and
    an arm having a first end provided with a pinion engaging with the rack, a second end connected to the other one of the main body and the openable body having no rack such that the arm pivots about the second end, and a braking unit configured to apply braking force to the pinion,
    wherein a straight line, which extends from a contact point between the rack and the pinion toward a rotation center of the pinion, is inclined toward the connecting part with the openable body being positioned in a vicinity of the closed position.

* * * * *